US012800475B2

(12) United States Patent
Song et al.

(10) Patent No.: US 12,800,475 B2
(45) Date of Patent: Nov. 17, 2026

(54) INTEGRATED OPTICAL MEASUREMENT DEVICE

(71) Applicant: SUGENTECH, INC., Daejeon (KR)

(72) Inventors: Moon Jay Song, Daejeon (KR); Myung Su Jeon, Sejong-si (KR); Seung Bum Yoo, Yongin-si (KR); Yun Jung Hwang, Daejeon (KR); Mi Jin Sohn, Daejeon (KR)

(73) Assignee: SUGENTECH, INC., Daejeon (KR)

( * ) Notice: Subject to any disclaimer, the term of this patent is extended or adjusted under 35 U.S.C. 154(b) by 112 days.

(21) Appl. No.: 18/939,545

(22) Filed: Nov. 7, 2024

(65) Prior Publication Data

US 2025/0060305 A1 Feb. 20, 2025

Related U.S. Application Data

(63) Continuation of application No. PCT/KR2023/008925, filed on Jun. 27, 2023.

(30) Foreign Application Priority Data

Oct. 4, 2022 (KR) ........................ 10-2022-0126212

(51) Int. Cl.
*G01N 21/01* (2006.01)
*G01N 21/17* (2006.01)
(Continued)

(52) U.S. Cl.
CPC ............. *G01N 21/01* (2013.01); *G01N 21/17* (2013.01); *G01N 21/255* (2013.01);
(Continued)

(58) Field of Classification Search
CPC ........ G01N 21/01; G01N 21/17; G01N 21/63; G01N 21/77; G01N 21/6408;
(Continued)

(56) References Cited

U.S. PATENT DOCUMENTS

2008/0038738 A1 2/2008 Weigum et al.
2020/0225158 A1* 7/2020 Booker .............. G01N 21/6428
(Continued)

FOREIGN PATENT DOCUMENTS

CN 211557550 U 9/2020
JP 5554289 B2 7/2014
(Continued)

OTHER PUBLICATIONS

English translation of KR 101957800. Obtained from Espacenet on Apr. 18, 2026. (Year: 2026).*
(Continued)

*Primary Examiner* — Michael A Lyons

(74) *Attorney, Agent, or Firm* — NKL LAW; Jae Youn Kim

(57) ABSTRACT

The present invention relates to an integrated optical measurement device. The integrated optical measurement device includes a light source module that includes first to Nth light source units each of which irradiates light of different wavelengths to a sample (N is a natural number greater than or equal to 2), when a direction in which the light source module irradiates light is downward, a detection module that is provided above the light source module to detect a reaction of the sample, a sample unit that is provided below the light source module to fix the sample, and an angle mount that fixes the first to Nth light source units at a predetermined angle, in which the first to Nth light source units are fixedly installed around the detection module.

9 Claims, 8 Drawing Sheets

(51) Int. Cl.
*G01N 21/25* (2006.01)
*G01N 21/64* (2006.01)
*G01N 21/77* (2006.01)

(52) U.S. Cl.
CPC ......... *G01N 21/6408* (2013.01); *G01N 21/77* (2013.01); *G01N 2021/0112* (2013.01); *G01N 2021/1736* (2013.01); *G01N 2021/1765* (2013.01); *G01N 2021/6471* (2013.01); *G01N 2021/7773* (2013.01); *G01N 2021/7786* (2013.01); *G01N 2201/06146* (2013.01)

(58) Field of Classification Search
CPC ... G01N 2021/1736; G01N 2021/6471; G01N 2021/7773; G01N 2021/7786; G01N 2021/0112
See application file for complete search history.

(56) References Cited

U.S. PATENT DOCUMENTS

| | | | | | |
|---|---|---|---|---|---|
| 2023/0137550 | A1* | 5/2023 | Kim | G01N 21/6452 250/458.1 |
| 2023/0213449 | A1* | 7/2023 | Dan | G01J 3/0256 250/459.1 |
| 2024/0230506 | A1* | 7/2024 | Tahara | G01N 15/1429 |

FOREIGN PATENT DOCUMENTS

| | | | | |
|---|---|---|---|---|
| JP | 2019-164170 A | 9/2019 | |
| KR | 10-2015-0110902 A | 10/2015 | |
| KR | 10-2016-0127876 A | 11/2016 | |
| KR | 10-1957800 B1 | 3/2019 | |
| KR | 10-2020-0141275 A | 12/2020 | |
| KR | 102267054 B1 * | 6/2021 | G01N 21/8483 |
| KR | 10-2021-0106810 A | 8/2021 | |

OTHER PUBLICATIONS

English translation of KR 1020150110902. Obtained from Espacenet on Apr. 18, 2026. (Year: 2026).*

* cited by examiner

INTEGRATED OPTICAL MEASUREMENT DEVICE

TECHNICAL FIELD

The present invention relates to an optical measurement device, and more particularly, to an integrated optical measurement device that measures a sample using multiple lights.

BACKGROUND ART

In the case of lateral flow immunoassay, various biomolecules and analytes are used to secure performance suitable for each purpose. This results in specific reaction effects and corresponding wavelength characteristics, and requires devices suitable for each measurement. Representative examples may include colored reactions using absorption characteristics of visible light, fluorescent reactions using excitation light, and time-resolved fluorescence signal measurement methods using phosphorescence.

Meanwhile, a point-of-care testing (POCT) device should be easily carried and moved due to its characteristics. The POCT device should be small, light, and have durability and performance. However, the point-of-care testing (POCT) technology utilizing the lateral flow immunoassay method has limitations described below. 1. A system that utilizes only light in a visible light range or a fluorescence analysis system that measures only the concentration of fluorescently labeled reactants should be operated separately. 2. The system has a plurality of drive systems inside, making it vulnerable to durability. 3. Devices that may simultaneously observe colored reactions and fluorescent reactions are large and heavy, making it difficult to respond in the field. In particular, the durability damage caused by the complex structure is directly related to the quantitative and qualitative analysis performance of the device, and the large and heavy devices are difficult to utilize in the field, which is a matter that the POCT needs to address.

(Patent Document 1) Korean Patent No. 10-2016-0127876 ("Device for Detecting Colored Reaction or Fluorescent reaction of Immunochromatography". Publication Date: Mar. 22, 2017)

DISCLOSURE

Technical Problem

The present invention has been made to solve the above-mentioned problems, and an object of the present invention provides an integrated optical measurement device in which a plurality of light sources, sensors, filters, lenses, etc., corresponding to each wavelength band are miniaturized and integrated into a single module when measuring a colored reaction or fluorescent reaction or time-resolved fluorescence signal of a lateral flow analysis cassette having different wavelength characteristics.

Technical Solution

To solve the problems described above, according to various embodiments of the present invention, an integrated optical measurement device includes a light source module that includes first to Nth light source units each of which irradiates light of different wavelengths to a sample (N is a natural number greater than or equal to 2), when a direction in which the light source module irradiates light is downward, a detection module that is provided above the light source module to detect a reaction of the sample, a sample unit that is provided below the light source module to fix the sample, and an angle mount that fixes the first to Nth light source units at a predetermined angle, in which the first to Nth light source units are fixedly installed around the detection module.

The detection module may include a sensor unit that acquires image information on the sample, a filter unit that is provided below the sensor unit, includes a plurality of filters that pass light reflected from the sample through a predetermined wavelength range, and is movably installed according to the sample and selectively applies the filters, and a lens unit that is arranged between the filter unit and the light source module.

The first to Nth light source units may be radially arranged on one side of the lens unit around the lens unit.

The first light source unit of the first to Nth light source units may include a plurality of first light sources that irradiate light of a first wavelength range to the sample, and the plurality of first light sources may be arranged in a longitudinal direction of the sample unit at a predetermined interval from each other.

The second light source unit of the first to Nth light source units may include a second light source that irradiates light of a second wavelength range to the sample, a plurality of light sources being arranged in a straight line in a longitudinal direction of the sample unit, a second light source lens that refracts or disperses the light of the second wavelength range irradiated from the second light source, and a filter for the second light source that filters the light irradiated from the second light source, and the second light source unit may be arranged on one side based on the longitudinal direction of the sample unit.

The third light source unit of the first to Nth light source units (N is a natural number greater than or equal to 3) may include a third light source that irradiates light of a third wavelength range to the sample, a plurality of light sources being arranged in a straight line in a longitudinal direction of the sample unit, a diffusion lens for the third light source that diffuses the light of the third wavelength range irradiated from the third light source, and a filter for the third light source that filters the light irradiated from the third light source, and the third light source unit may be arranged to face the second light source unit of the first to Nth light source units based on the longitudinal direction of the sample unit.

The sensor unit may include one of a 1D or 2D sensor.

Each of the first to Nth light source units may include at least one light source, and the angle mount may include an angle mount for the light source that fixes the light source included in the first to Nth light source unit at a predetermined angle.

The second and third light source units of the first to Nth light source units may include filters for the second and third light sources, respectively, for filtering the irradiated light, and the angle mount may further include an angle mount for a filter that fixes at least one of the filter for the second light source and the filter for the third light source at a predetermined angle.

When a surface in contact with the first light source unit of the first to Nth light source units is referred to as a first light source surface, a surface in contact with the second light source unit is referred to as a second light source surface, a surface in contact with the third light source unit is referred to as a third light source surface, a surface in contact with the lens unit is referred to as a lens surface, and a surface in contact with the sample unit is referred to as a sample surface, an angle between the sample surface and the first light source surface may be smaller than an angle between the sample surface and the second light source surface and an angle between the sample surface and the third light source surface.

Advantageous Effects

According to an integrated optical measurement device according to various embodiments of the present invention as described above, by integrating lenses and sensors that are separately present for each measurement mode into one lens unit and one sensor unit, it is possible to measure a color reaction, a fluorescent reaction, and a time-resolved fluorescence signal with one optical module.

In addition, by configuring a light source module to which a plurality of light source elements is applied from 1 channel to 4 channels by wavelength to integrate a light source lens into a light source module, and by compressing and applying a filter and a diffusion plate to minimize unnecessary space and elements, it is possible to make a device smaller and lighter.

In addition, by eliminating a separate driving unit and applying a 1D or 2D array sensor and arranging a light source module in an appropriate location to provide a flat light amount, it is possible to cover the entire area of the sample to be measured.

DESCRIPTION OF MAIN REFERENCE NUMERALS OF DRAWINGS

Figure 1:
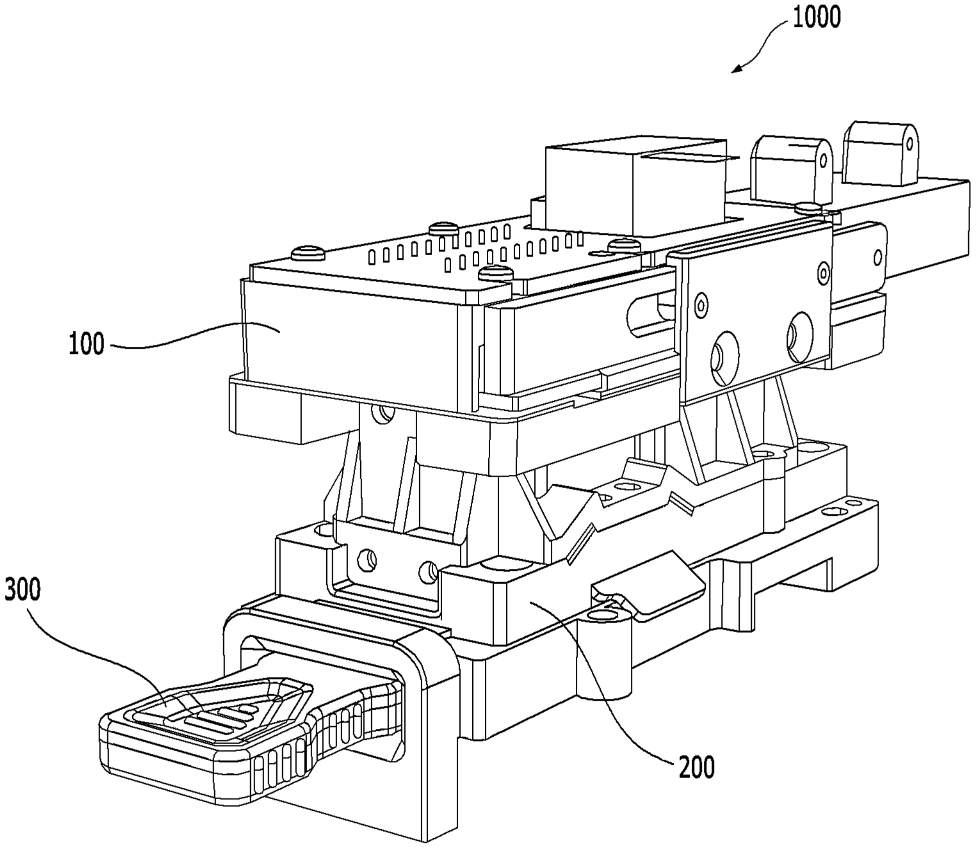
FIG. 1 is a perspective view illustrating an integrated optical measurement device according to an embodiment of the present invention.

10: Sample
1000: Integrated optical measurement device
100: Detection module
110: Sensor unit
120: Filter unit 121: First filter 122: Second filter
123: Third filter
130: Lens unit 130': Lens surface
200: Light source module
210: First light source unit 211: First light source 211': First light source

212: Base for first light source 210': First lights source surface (1) 210": First light source surface (2)
220: Second light source unit 221: Second light source 222: Base for second light source
223: Lens for second light source 224: Filter for second light source 220': Second light source surface
230: Third light source unit 231: Third light source 232: Base for third light source
233: Diffusion lens for third light source 234: Filter for third light source 230': Third light source surface
300: Sample unit 300': Sample surface
400: Angle mount 410: Angle mount for light source 420: Angle mount for filter

BEST MODE

In order to explain the present invention and the operational advantages of the present invention and the objects achieved by the practice of the present invention, preferred embodiments of the present invention will be exemplified below, and the present invention will be described with reference thereto.

First, the terms used in this application are only used to describe specific embodiments, and are not intended to limit the present invention, and singular expressions may include plural expressions unless the context clearly indicates otherwise. It should be understood that term "include" or "have" used in the present specification, specify the presence of features, numerals, steps, operations, components, parts mentioned in the present specification, or combinations thereof, but do not preclude the presence or addition of one or more other features, numerals, steps, operations, components, parts, or combinations thereof.

In describing exemplary embodiments of the present invention, well-known functions or constructions will not be described in detail since they may unnecessarily obscure the understanding of the present invention.

FIG. 1 is a perspective view illustrating an integrated optical measurement device according to an embodiment of the present invention.

Figure 2:
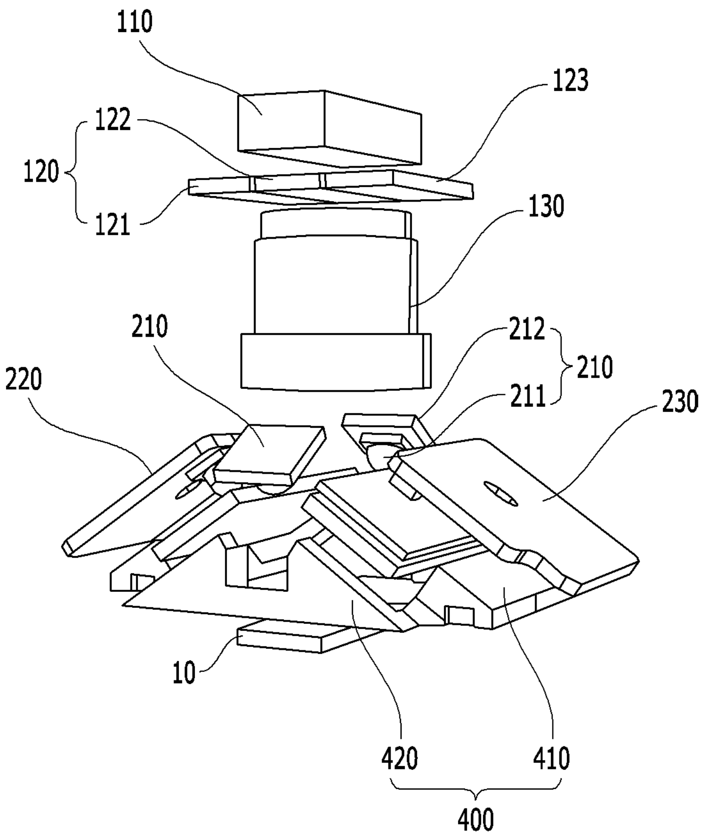
FIG. 2 is a perspective view illustrating an inside of the integrated optical measurement device according to an embodiment of the present invention.

FIG. 2 is a perspective view illustrating an inside of the integrated optical measurement device according to an embodiment of the present invention.

As illustrated in FIG. 1 or 2, an integrated optical measurement device according to an embodiment of the present invention includes a light source module 200, a detection module 100, a sample unit 300, and an angle mount 400.

The light source module 200 includes first to Nth light source units that irradiate light to a sample 10, in which the first to Nth light source units irradiate light of different wavelengths. Here, N means a natural number greater than or equal to 2.

When a direction in which the light source module 200 irradiates light is downward, the detection module 100 is provided above the light source module 200 to detect the reaction of the sample 10 according to the light irradiation.

The sample unit 300 is provided below the light source module 200 to fix the sample 10.

The angle mount 400 corresponds to the first to Nth light source units to fix the first to Nth light source units at a predetermined angle.

In this case, the first to Nth light source units may be fixedly installed around the detection module 100 for inspection of multiple wavelength light without a mirror or a prism. By fixing the first to Nth light source units, the device may be portable and have enhanced vibration resistance and durability. In addition, the size of the first to Nth light source units may be reduced by not including the mirror or prism. In addition, the sample unit 300 may include a cartridge.

Specifically, referring to FIG. 2, the detection module 100 includes a sensor unit 110, a filter unit 120, and a lens unit 130.

The sensor unit 110 acquires image information on the sample 10.

The filter unit 120 is provided below the sensor unit 110 and includes a plurality of filters, and passes light of a predetermined wavelength range among the light reflected from the sample 10, but is installed movably according to the sample 10 and selectively applies the plurality of filters.

The lens unit 130 is arranged between the filter unit 120 and the light source module 200.

More specifically, the sensor unit 110 may include one of a 1D sensor or a 2D sensor. Therefore, the sensor unit 110 may measure the sample 10 without a separate driving unit. In addition, the filter unit 120 can move left/right or up/down, so the plurality of filters may be automatically replaced. The filters may be automatically replaced by recognizing a specific barcode or a QR code in the sample unit 300.

In addition, the first to Nth light source unit may be radially arranged on one side of the lens unit 130. The first to Nth light source unit will be described in detail in the following description.

Among the first to Nth light source units, the first light source unit 210 may include a first light source 211 and a base 212 for the first light source.

The number of first light sources 211 is plural, and each first source 211 is fixed to the base 212 for the first light source to irradiate light of a first wavelength range to the sample 10. Specifically, the first light source unit 210 is a light source unit for time-resolved fluorescent reaction, and the plurality of first light sources 211 may be arranged in a longitudinal direction of the sample unit 300 at a predetermined interval from each other.

Figure 3:
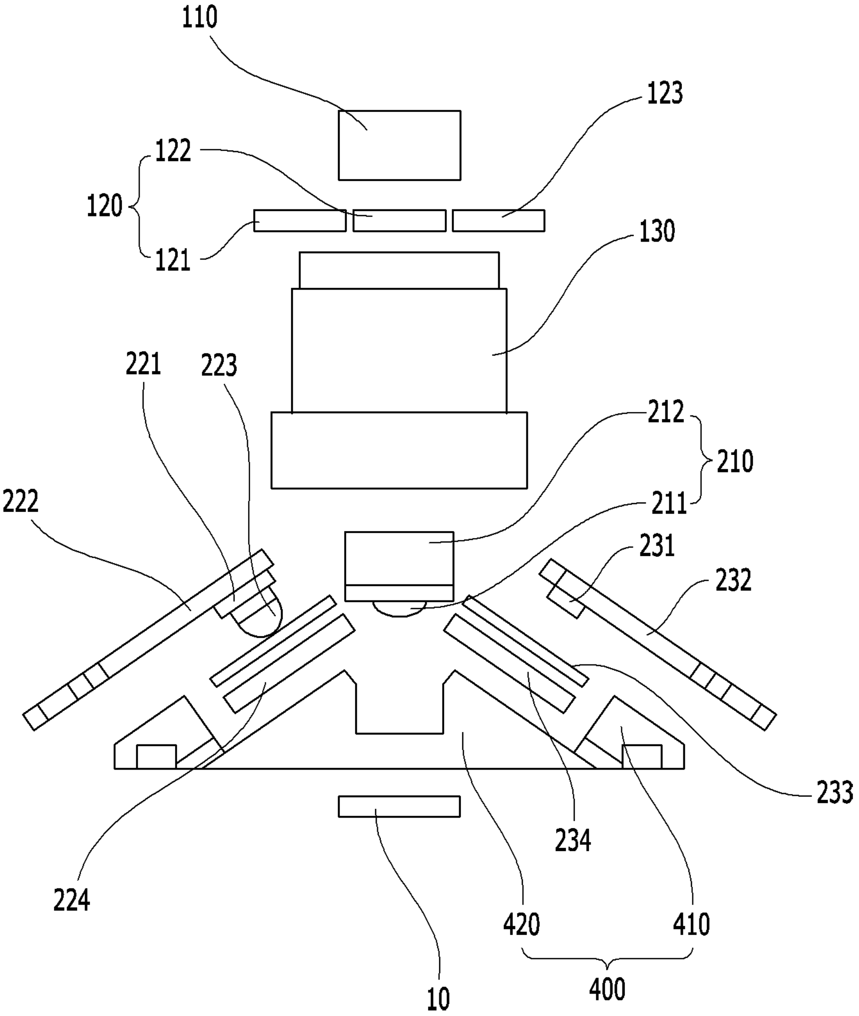
FIG. 3 is a front view illustrating the integrated optical measurement device according to an embodiment of the present invention.
Figure 4:
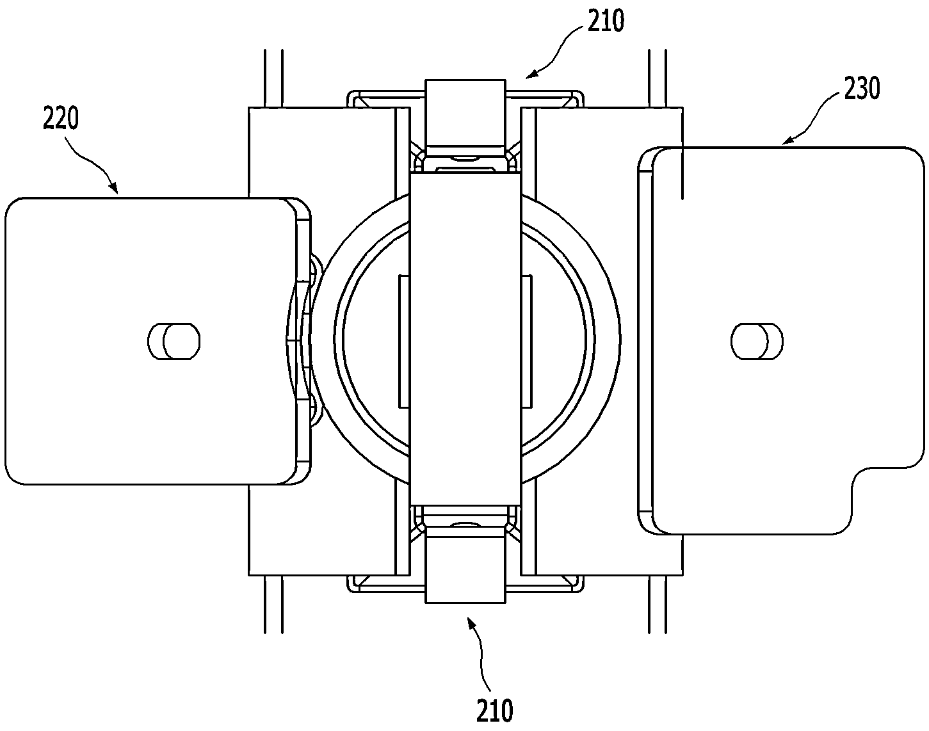
FIG. 4 is a diagram illustrating a top portion of the integrated optical measurement device according to an embodiment of the present invention.

FIG. 3 is a front view of the integrated optical measurement device according to an embodiment of the present invention, and FIG. 4 is a drawing illustrating a top portion of the integrated optical measurement device according to an embodiment of the present invention.

As illustrated in FIG. 3 or 4, a second light source unit 220 of the first to Nth light source units includes a second light source 221, a lens 223 for the second light source, and a filter 224 for the second light source.

The second light source 221 is fixed to a base 222 for the second light source to irradiate light to the sample 10, but the light may be light of a second wavelength range different from the first wavelength range. In addition, the second light source 221 includes a plurality of light sources, and a plurality of the light sources may be arranged in a straight line in the longitudinal direction of the sample unit 300. Specifically, the second light source 221 may include two light sources.

The lens 223 for the second light source may refract or disperse light of the second wavelength range irradiated from the second light source 221.

The filter 224 for the second light source may filter light irradiated from the second light source 221.

Specifically, the second light source unit 220 is a light source unit for fluorescent reaction, and may be arranged in a direction perpendicular to the longitudinal direction of the sample unit 300.

Meanwhile, the third light source unit 230 of the first to Nth light source units may include a third light source 231, a diffusion lens 233 for the third light source, and a filter 234 for the third light source.

The third light source 231 is fixed to a base 232 for the third light source and may include a plurality of light sources. In addition, the plurality of the light sources may be arranged in a straight line in the longitudinal direction of the sample unit 300, and more specifically, the third light source 231 may include eight light sources and irradiate light of a third wavelength range.

The diffusion lens 233 for the third light source diffuses light of the third wavelength range irradiated from the third light source 231.

The filter 234 for the third light source filters the light irradiated from the third light source 231.

In addition, the third light source unit 230 is a light source unit for colored reaction, and may be arranged in a direction facing the second light source unit 220.

Figure 5:
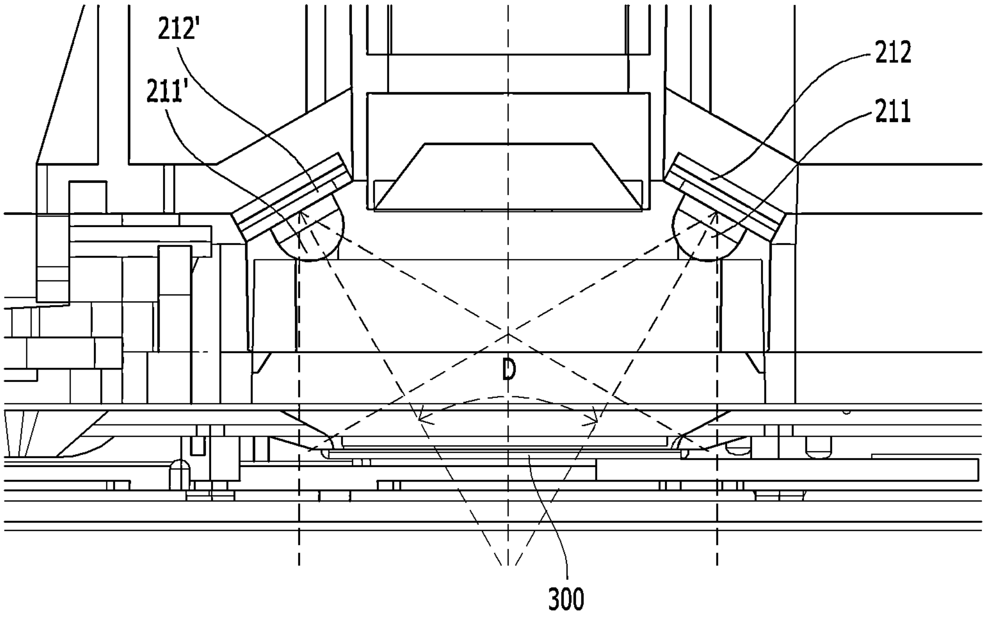
FIG. 5 is an enlarged view of a side portion of the integrated optical measurement device according to an embodiment of the present invention.

FIG. 5 is an enlarged view of a side portion of the integrated optical measurement device according to an embodiment of the present invention.

As illustrated in FIG. 5, a plurality of first light sources 211 and 211' may be arranged in the longitudinal direction of the sample unit 300 at a predetermined interval from each other. In this case, the plurality of the first light sources 211 and 211' may be arranged in the base 212 for the first light source and 212' at a predetermined angle to simultaneously irradiate light to the sample 10. In this case, the angle may be a size having a uniform flatness with respect to brightness of the light irradiated to the sample 10. Accordingly, the light irradiated to the sample 10 by the first light source unit 210 may be reflected by the sample 10 and pass through the lens unit 130.

Figure 6:
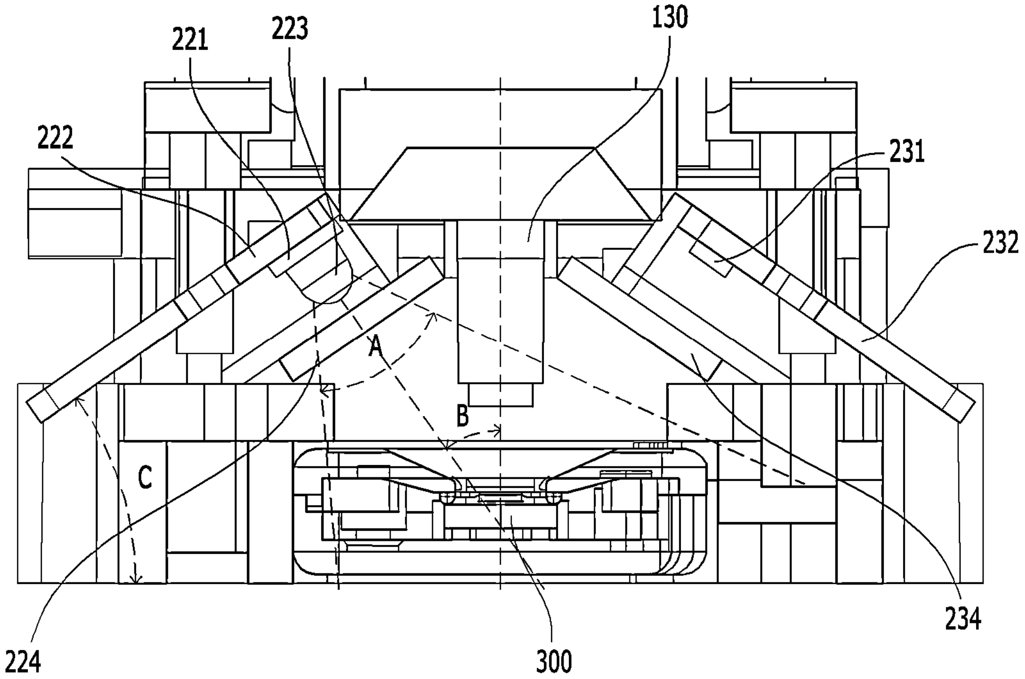
FIG. 6 is an enlarged view of a front portion of the integrated optical measurement device according to an embodiment of the present invention.
Figure 7A:
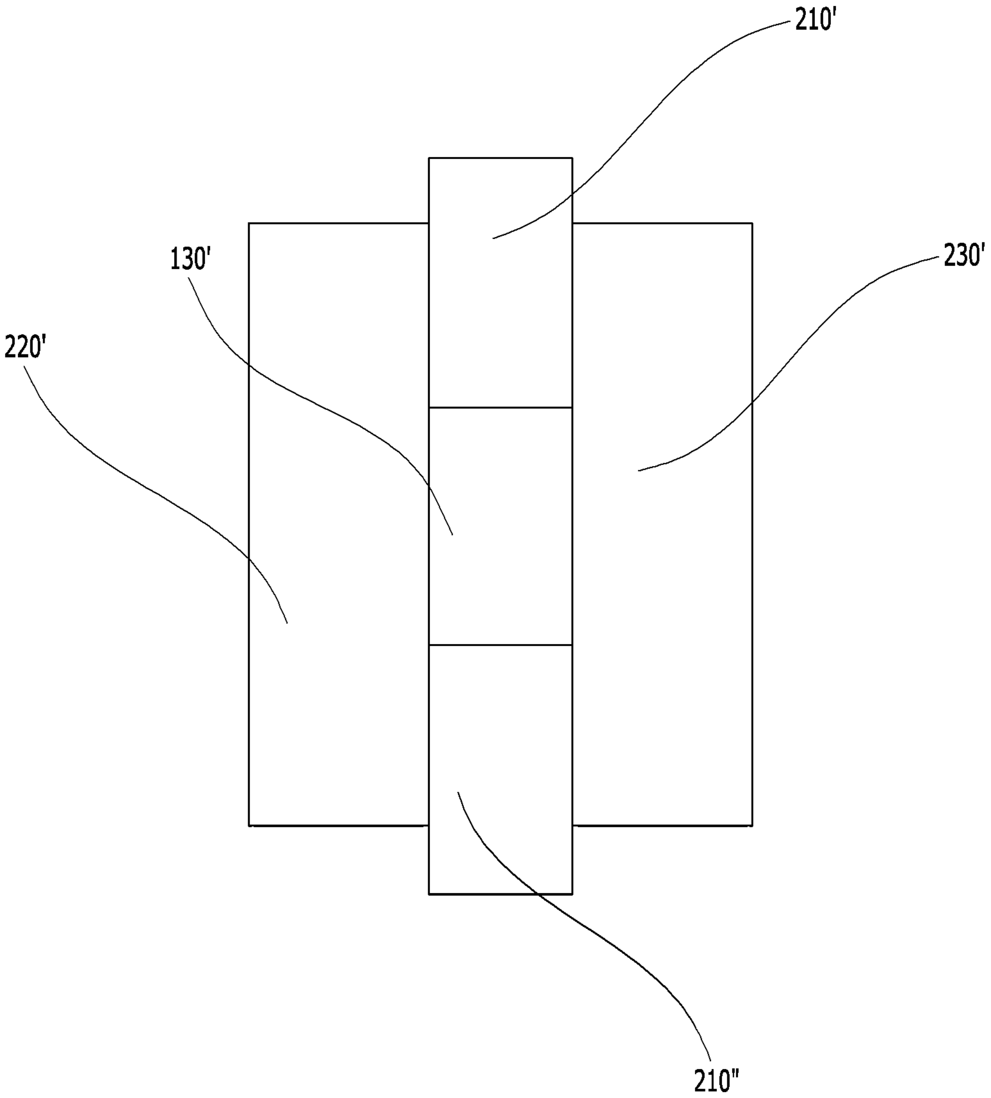
FIG. 7A to FIG. 7D are diagrams illustrating a dark room of the integrated optical measurement device according to an embodiment of the present invention.
Figure 7B:
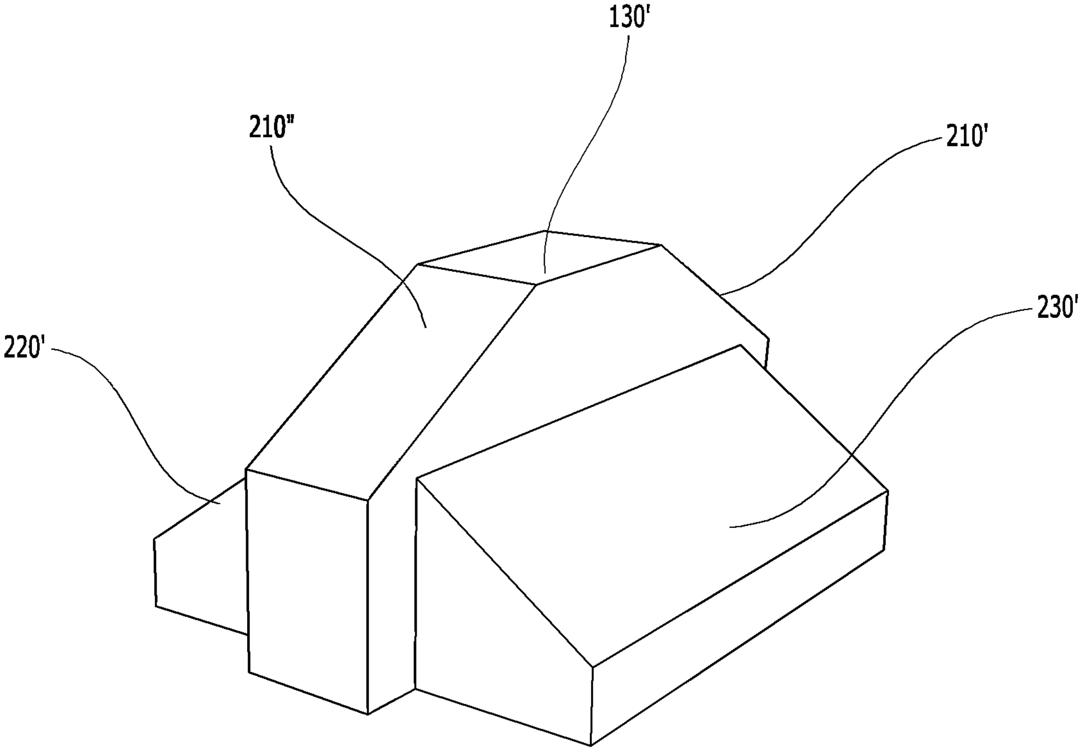
Figure 7C:
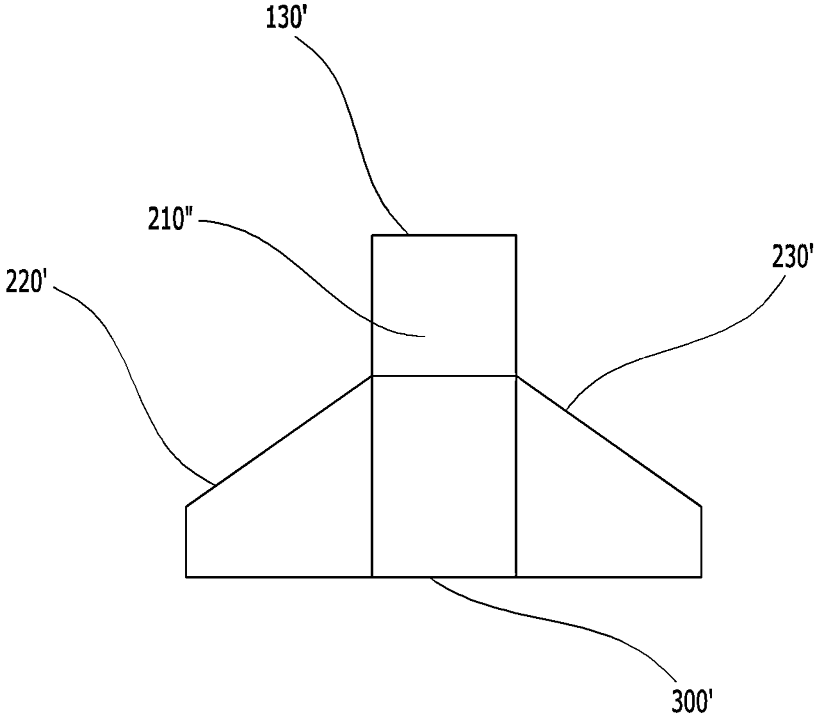
Figure 7D:
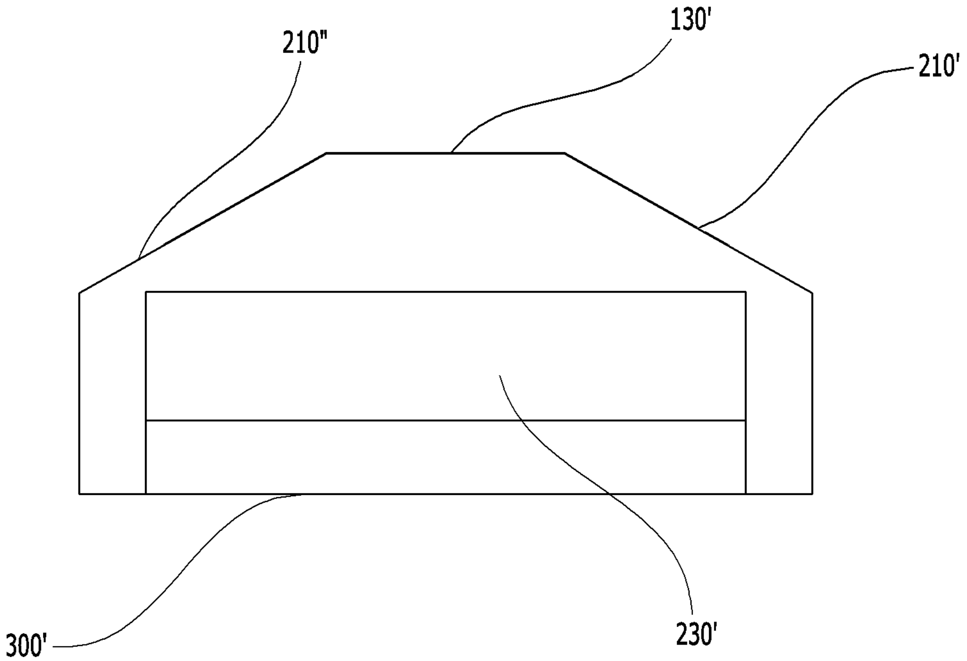

FIG. 6 is an enlarged view of a front portion of the integrated optical measurement device according to an embodiment of the present invention.

As illustrated in FIG. 6, the second light source unit 220 and the third light source unit 230 may also be arranged at a predetermined angle, and may be arranged in a direction facing each other in the direction perpendicular to the longitudinal direction of the sample unit 300.

In order for the first to Nth light source units illustrated in FIGS. 2 and 3 to be arranged and fixed at a predetermined angle, the angle mount 400 may include an angle mount 410 for a light source. The angle mount 410 for the light source is for fixing a light source.

Specifically, the angle mount 410 for the light source may fix at least one of the second light source 221 and the third light source 231 at a predetermined angle.

In addition, the angle mount 400 may include an angle mount 420 for a filter for fixing the filter.

Specifically, the angle mount 420 for the filter may fix at least one of the filter 224 for the second light source and the filter 234 for the third light source at a predetermined angle.

FIGS. 7A-7D are diagrams illustrating a dark room of the integrated optical measurement device according to an embodiment of the present invention. As illustrated in FIGS. 7A-7D, a dark room (space) may be formed by the first light source unit 210, the second light source unit 220, the third light source unit 230, the lens unit 130, and the sample unit 300 of the integrated optical measurement device. Specifically, a surface in contact with the first light source unit 210 will be referred to as first light source surfaces 210' and 210", a surface in contact with the second light source unit 220 will be referred to as a second light source surface 220', a surface in contact with the third light source unit 230 will be referred to as a third light source surface 230', a surface in contact with the lens unit 130 will be referred to as a lens surface 130', and a surface in contact with the sample unit 300 will be referred to as a sample surface 300'. In this case, the first light source surfaces 210' and 210" may have a smaller angle than the second light source surface 220' and the third light source surface 230' with respect to the sample surface 300'.

More specifically, the angle formed by the sample surface 300' and the first light source surface 210' and 210" based on the sample surface 300' may be 30°, and the angle formed by the sample surface 300' and the second light source surface 220' and the third light source surface 230' may be 35°, respectively.

Through the above-described predetermined angle, a flat amount of light can be provided to the entire area of the sample 10 to be measured in a limited space.

That is, unlike the conventional method of having to use separate diagnostic equipment to measure the colored reaction, the fluorescent reaction, and the time-resolved fluorescence signal, an integrated optical measurement device 1000 according to an embodiment of the present invention enables measurement for each mode by applying three optical systems with one device. In addition, the light source of the wavelength band required for each measurement mode is applied as a multi-channel, and the driving unit is removed, enabling the quantitative and qualitative measurement. Specifically, unlike the conventional lateral flow analysis in which the sensor unit moves and measures, the present invention provides a mobile integrated POCT device capable of highly reliable measurement by fixing the movement of the sensor unit 110 to avoid the noise generated during the movement.

Although exemplary embodiments of the present invention have been described hereinabove, the present invention is not limited to the above-mentioned specific exemplary embodiments. That is, many modifications and alterations of the present invention may be made by those skilled in the art to which the present invention pertains without departing from the spirit and scope of the accompanying claims. In addition, it is to be considered that all of these modifications and alterations fall within the scope of the present invention.

The invention claimed is:

1. An integrated optical measurement device, comprising:

a light source module that includes first to Nth light source assemblies, each of the first to Nth light source assemblies being configured to irradiate light of different wavelengths to a sample, wherein N is a natural number greater than or equal to 2;

a detection module provided above the light source module and configured to detect a reaction of the sample, wherein the light source module irradiates light downward to the sample;

a sample holder provided below the light source module to fix the sample; and an angle mount that fixes the first to Nth light source assemblies at a predetermined angle, wherein the first to Nth light source assemblies are fixedly installed around the detection module, wherein the detection module includes:

a sensor that acquires image information of the sample;

a filter unit disposed below the sensor and including a plurality of filters that pass light reflected from the sample within a predetermined wavelength range, the filter unit being movable and selectively applying the plurality of filters based on the sample; and a lens arranged between the filter unit and the light source module, and wherein the filter unit recognizes a specific barcode or QR code corresponding to the sample fixed by the sample holder, and the filter unit moves based on a result of the recognition to replace one of the plurality of filters disposed below the sensor.

2. The integrated optical measurement device of claim 1, wherein the first to Nth light source assemblies are radially arranged below the lens.

3. The integrated optical measurement device of claim 1, wherein a first light source assembly of the first to Nth light source assemblies includes a plurality of first light sources that irradiate light of a first wavelength range to the sample, and the plurality of first light sources is arranged in a longitudinal direction of the sample holder at a predetermined interval from each other.

4. The integrated optical measurement device of claim 1, wherein a second light source assembly of the first to Nth light source assemblies includes:

a plurality of second light sources that irradiates light of a second wavelength range to the sample, the plurality of second light sources being arranged in a straight line in a longitudinal direction of the sample holder;

a second light source lens that refracts or disperses the light of the second wavelength range irradiated from the plurality of second light sources; and a filter for the plurality of second light sources that filters the light irradiated from the plurality of second light sources, and wherein the second light source assembly is arranged with respect to the longitudinal direction of the sample holder.

5. The integrated optical measurement device of claim 4, wherein a third light source assembly of the first to Nth light source assemblies, wherein N is a natural number greater than or equal to 3, includes:

a plurality of third light sources that irradiates light of a third wavelength range to the sample, the plurality of third light sources being arranged in a straight line in the longitudinal direction of the sample holder;

a diffusion lens for the plurality of third light sources that diffuses the light of the third wavelength range irradiated from the plurality of third light sources; and a filter for the plurality of third light sources that filters the light irradiated from the plurality of third light sources, and wherein the third light source assembly is arranged to face the second light source assembly with respect to the longitudinal direction of the sample holder.

6. The integrated optical measurement device of claim 5, wherein the second and third light source assemblies include the filter for the plurality of second light sources and the filter for the plurality of third light sources, respectively, and the angle mount further includes a filter angle mount that fixes at least one of the filter for the plurality of second light sources, the filter for the plurality of third light sources, or any combination thereof at a predetermined angle.

7. The integrated optical measurement device of claim 1, wherein the sensor includes a one-dimensional (1D) sensor or a two-dimensional (2D) sensor.

8. The integrated optical measurement device of claim 1, wherein each of the first to Nth light source assemblies includes at least one light source, and the angle mount includes a light-source angle mount that fixes the at least one light source included in the first to Nth light source assemblies at a predetermined angle.

9. The integrated optical measurement device of claim 1, wherein the first to Nth light source assemblies include a first light source assembly, a second light source assembly, and a third light source assembly, wherein a surface in contact with the first light source assembly is referred to as a first light source surface, a surface in contact with the second light source assembly is referred to as a second light source surface, a surface in contact with the third light source assembly is referred to as a third light source surface, a surface in contact with the lens is referred to as a lens surface, and a surface in contact with the sample holder is referred to as a sample surface, and wherein an angle between the sample surface and the first light source surface is smaller than an angle between the sample surface and the second light source surface and an angle between the sample surface and the third light source surface.

* * * * *